(12) United States Patent
Kim et al.

(10) Patent No.: US 11,750,048 B2
(45) Date of Patent: Sep. 5, 2023

(54) MOTOR WITH NOVEL HOLLOW SHAFT

(71) Applicant: BMC CO., LTD., Anseong-si (KR)

(72) Inventors: Ok Yun Kim, Seoul (KR); Kea Ho Lee, Gwangju (KR); Haeng Chul Sin, Gwangju (KR); Gwan Seon Jeong, Gwangju (KR)

(73) Assignee: BMC CO., LTD., Anseong-si (KR)

( * ) Notice: Subject to any disclaimer, the term of this patent is extended or adjusted under 35 U.S.C. 154(b) by 281 days.

(21) Appl. No.: 17/295,437

(22) PCT Filed: Dec. 18, 2019

(86) PCT No.: PCT/KR2019/018043
§ 371 (c)(1),
(2) Date: May 20, 2021

(87) PCT Pub. No.: WO2020/159078
PCT Pub. Date: Aug. 6, 2020

(65) Prior Publication Data
US 2022/0014060 A1    Jan. 13, 2022

(30) Foreign Application Priority Data
Feb. 1, 2019  (KR) .......................... 10-2019-0013689

(51) Int. Cl.
*H02K 1/27*        (2022.01)
*H02K 1/278*       (2022.01)
(Continued)

(52) U.S. Cl.
CPC ........... *H02K 1/278* (2013.01); *H02K 1/2786* (2013.01); *H02K 5/04* (2013.01); *H02K 7/003* (2013.01); *H02K 7/08* (2013.01); *H02K 15/14* (2013.01)

(58) Field of Classification Search
CPC .......... H02K 1/278; H02K 5/04; H02K 7/003; H02K 7/08; H02K 15/14
(Continued)

(56) References Cited

U.S. PATENT DOCUMENTS

2008/0042503 A1* 2/2008 Hartkorn .................. H02K 1/28
                                                         310/90
2013/0112104 A1* 5/2013 Tamai ..................... F16H 25/24
                                                         74/89.34
(Continued)

FOREIGN PATENT DOCUMENTS

DE    102011056602 A1 * 6/2012 ............... G01R 7/06
JP    2017-225319 A    12/2017
(Continued)

OTHER PUBLICATIONS

Machine translation of 102011056602; Yoshitomi et al. (Year: 2012).*
(Continued)

*Primary Examiner* — Terrance L Kenerly
(74) *Attorney, Agent, or Firm* — Revolution IP, PLLC

(57) ABSTRACT

The hollow shaft motor according to the present invention comprises: a housing 11 having a cylindrical shape; an upper cover 12 coupled to an upper portion of the housing 11; a lower cover 15 coupled to a lower portion of the housing 11; a stator assembly 20 located in the housing 11; and a rotor assembly 30 located in the stator assembly 20 to rotate, comprising a hollow shaft 31, a rotor core 32 coupled to the hollow shaft 31, and a plurality of magnets 33 arranged on an outer circumferential surface of the rotor core 32 at a certain interval, wherein the hollow shaft 31 is manufactured with a plastic resin by an insert injection molding in the state where the rotor core 32 and the magnet 33 are located in an insert injection mold.

4 Claims, 10 Drawing Sheets

(51) Int. Cl.
H02K 1/2786 (2022.01)
H02K 5/04 (2006.01)
H02K 7/00 (2006.01)
H02K 7/08 (2006.01)
H02K 15/14 (2006.01)

(58) Field of Classification Search
USPC ........................................................ 310/152
See application file for complete search history.

(56) References Cited

U.S. PATENT DOCUMENTS

2015/0375727 A1* 12/2015 Weh .................. F16H 57/00
29/428
2017/0237316 A1 8/2017 Filgertshofer

FOREIGN PATENT DOCUMENTS

| KR | 10-2015-0090692 A | 8/2015 |
| KR | 10-2016-0001681 A | 1/2016 |
| KR | 10-2017-0006535 A | 1/2017 |

OTHER PUBLICATIONS

International Search Report for PCT/KR2019/018043 dated Apr. 3, 2020 from Korean Intellectual Property Office.

* cited by examiner

[Fig. 1]
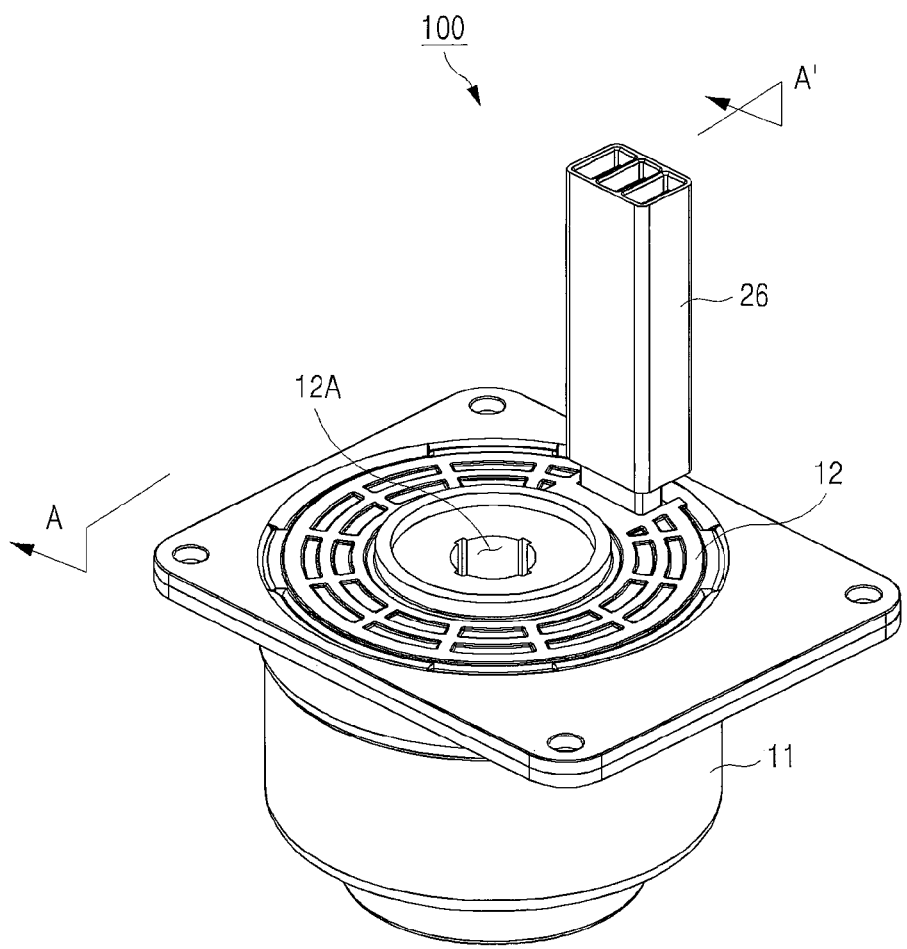

[Fig. 2]
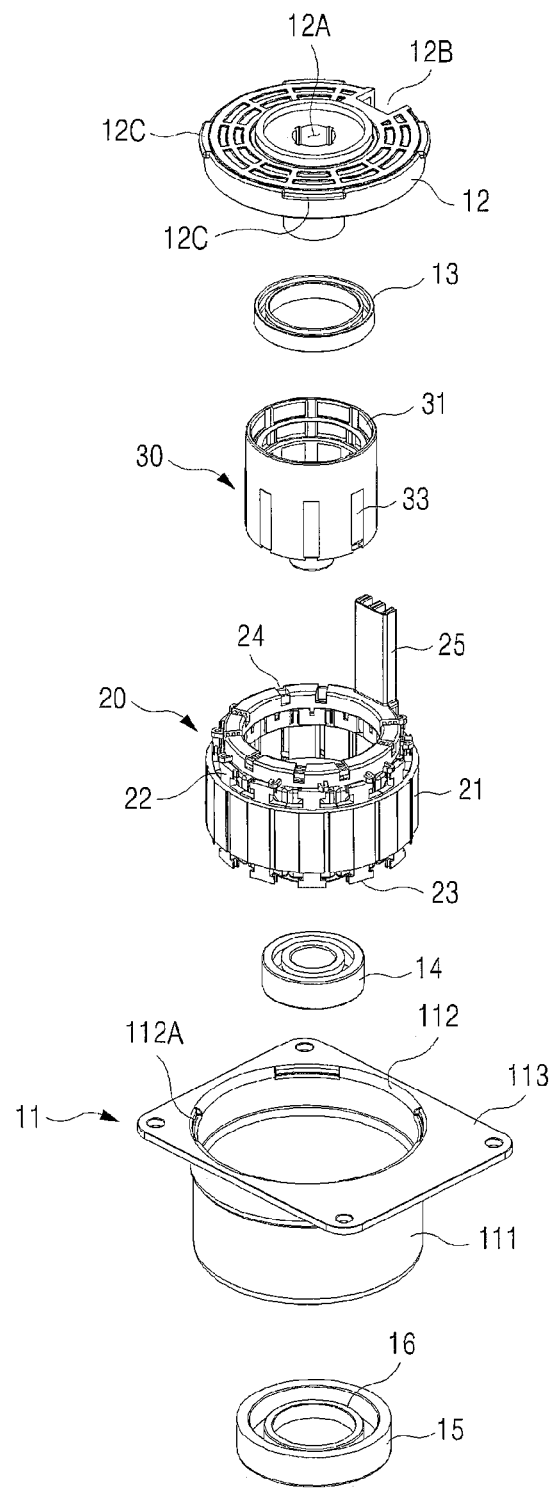

[Fig. 3]
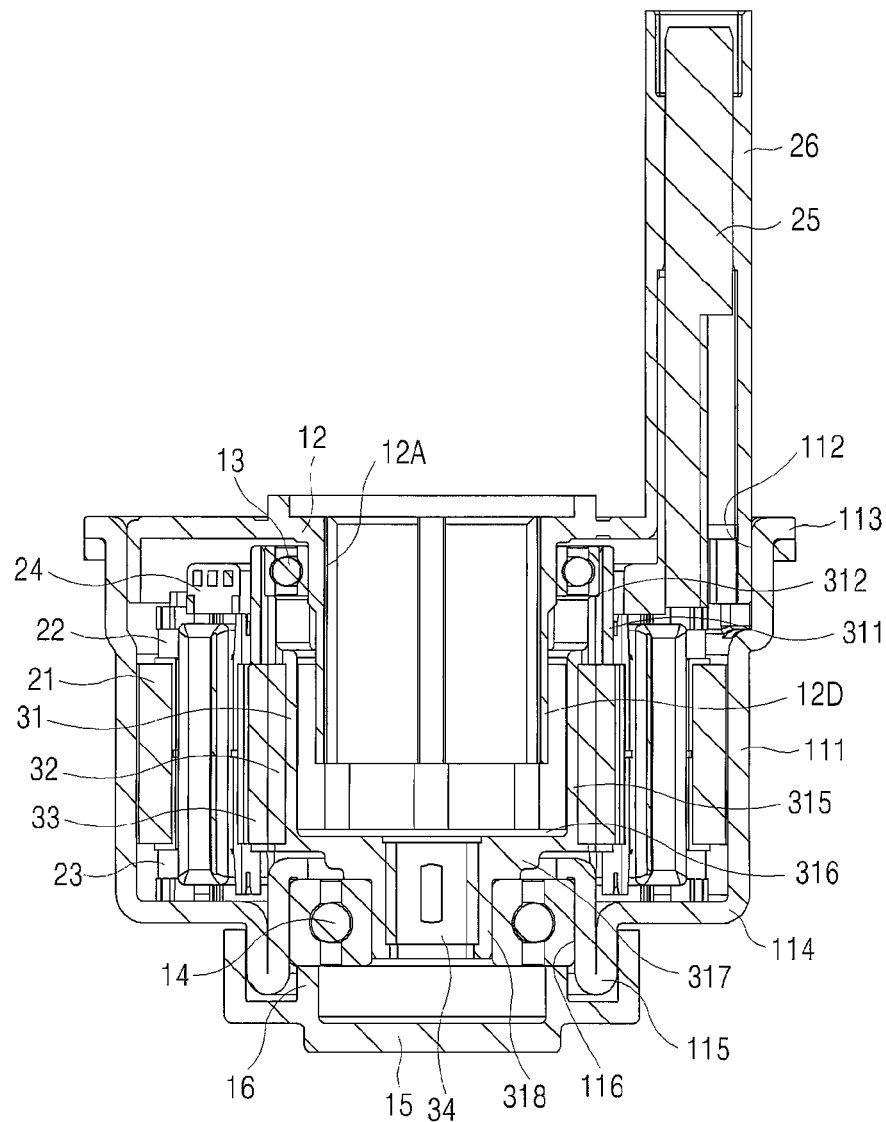

[Fig. 4]
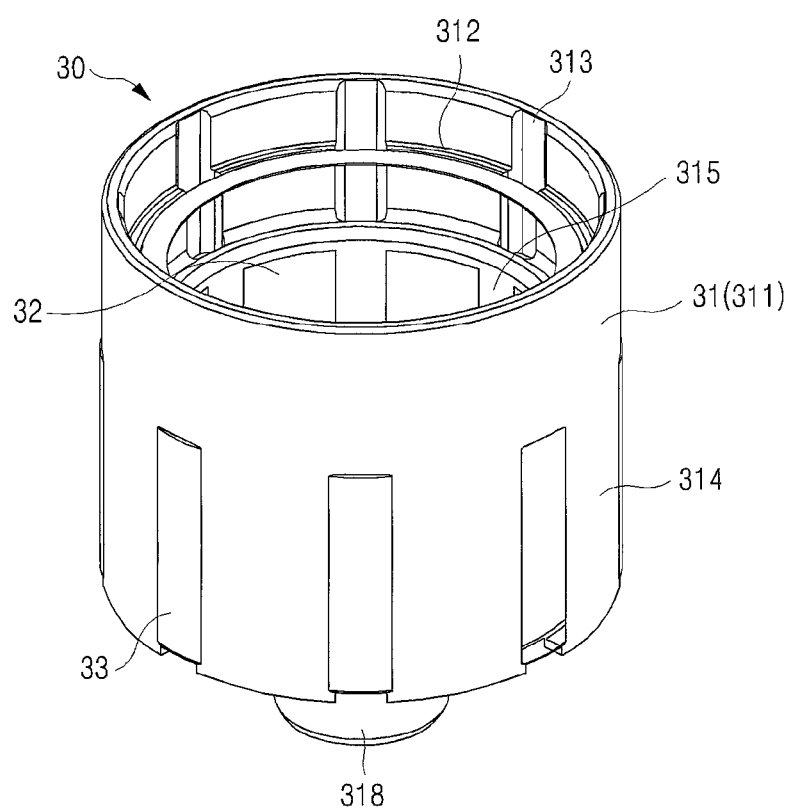

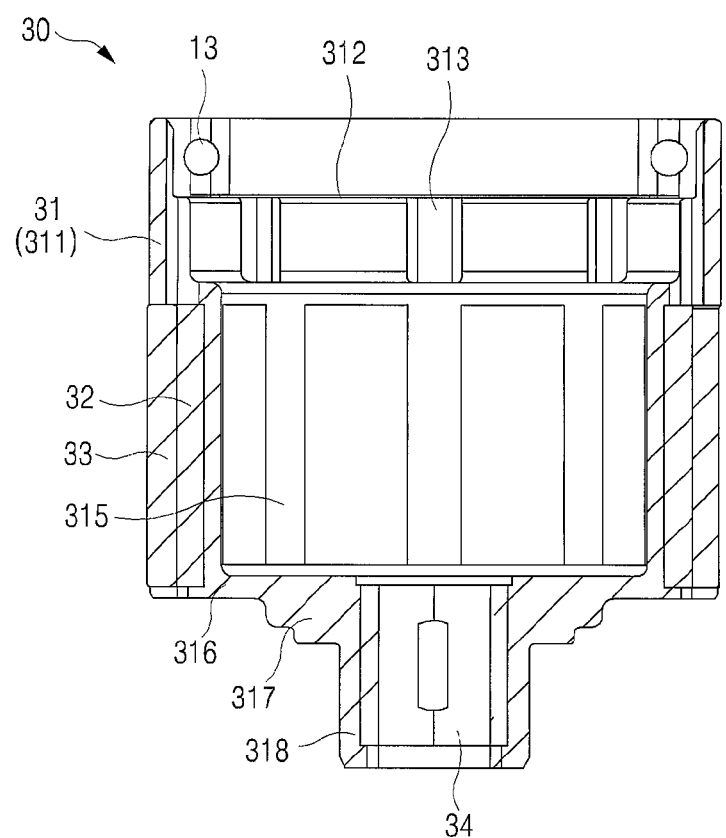
[Fig. 5]

[Fig. 6]
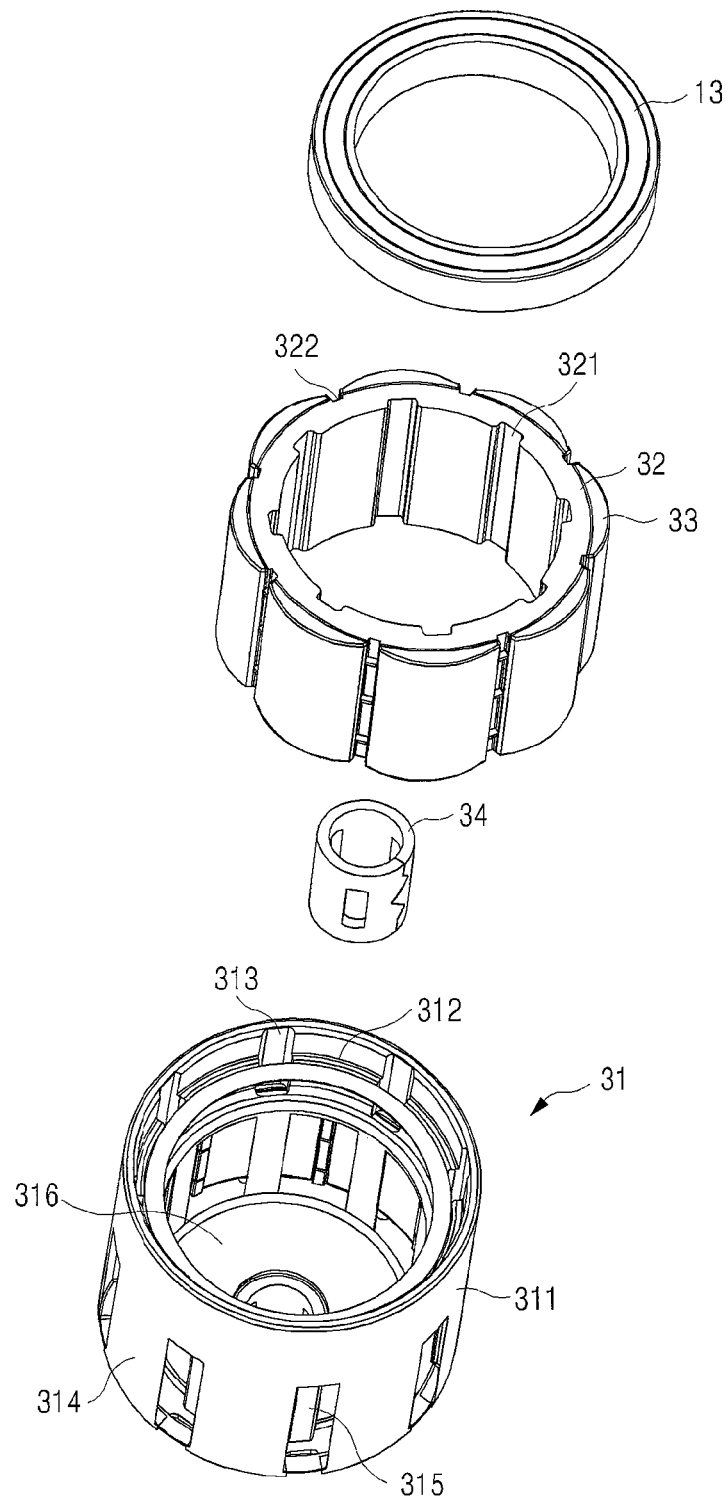

[Fig. 7]
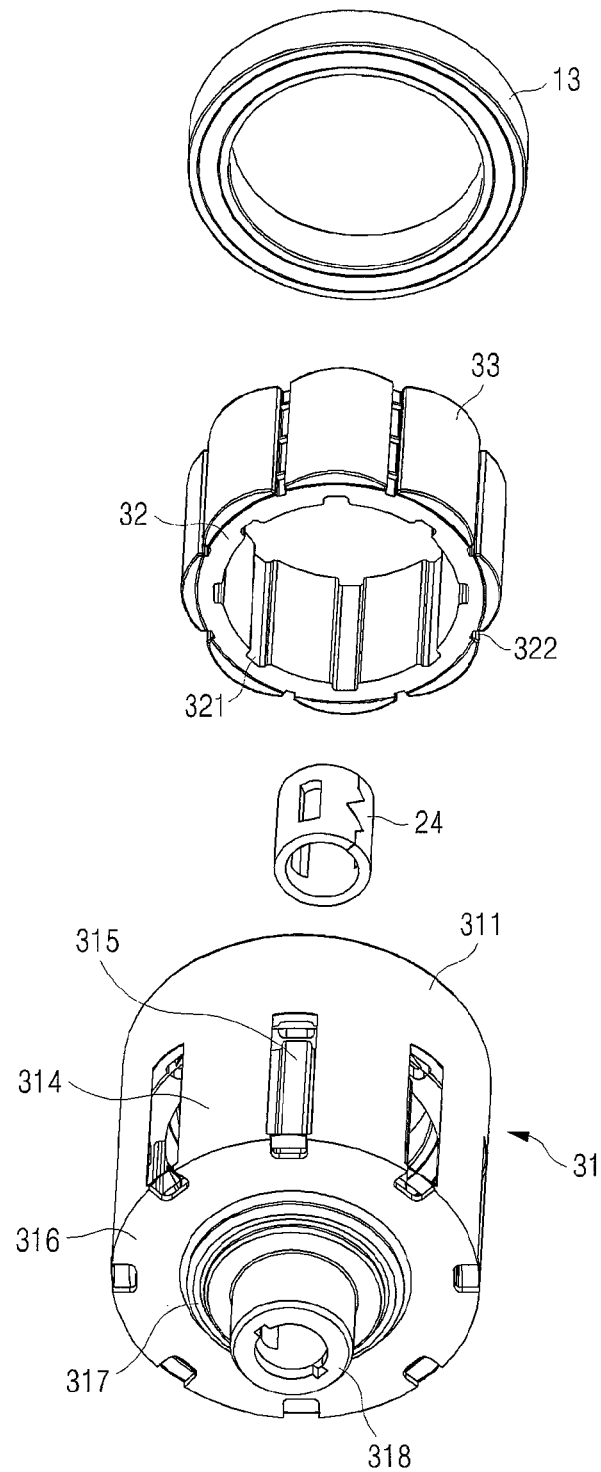

[Fig. 8]
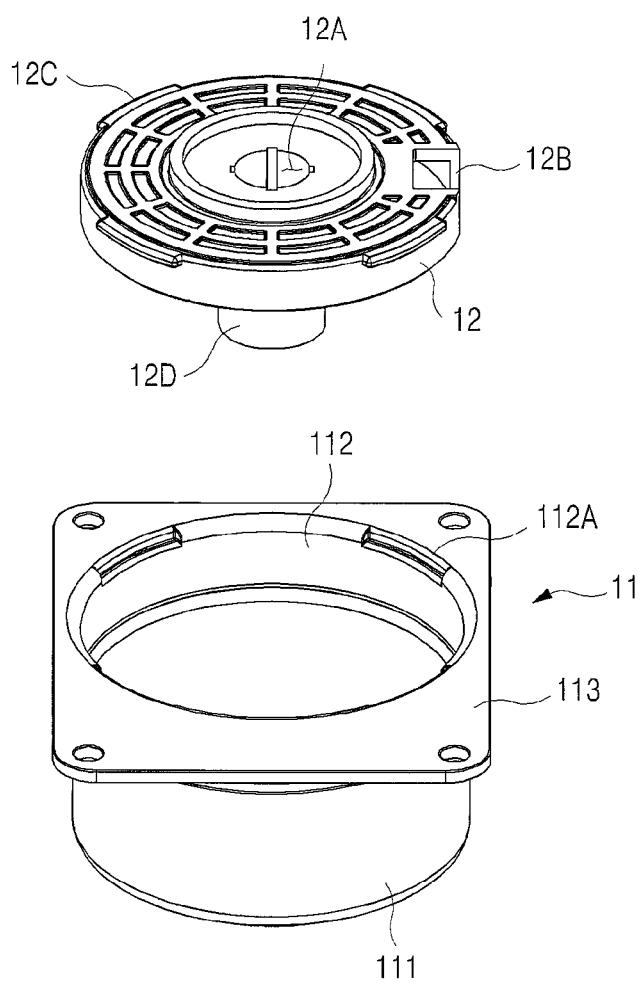

[Fig. 9]
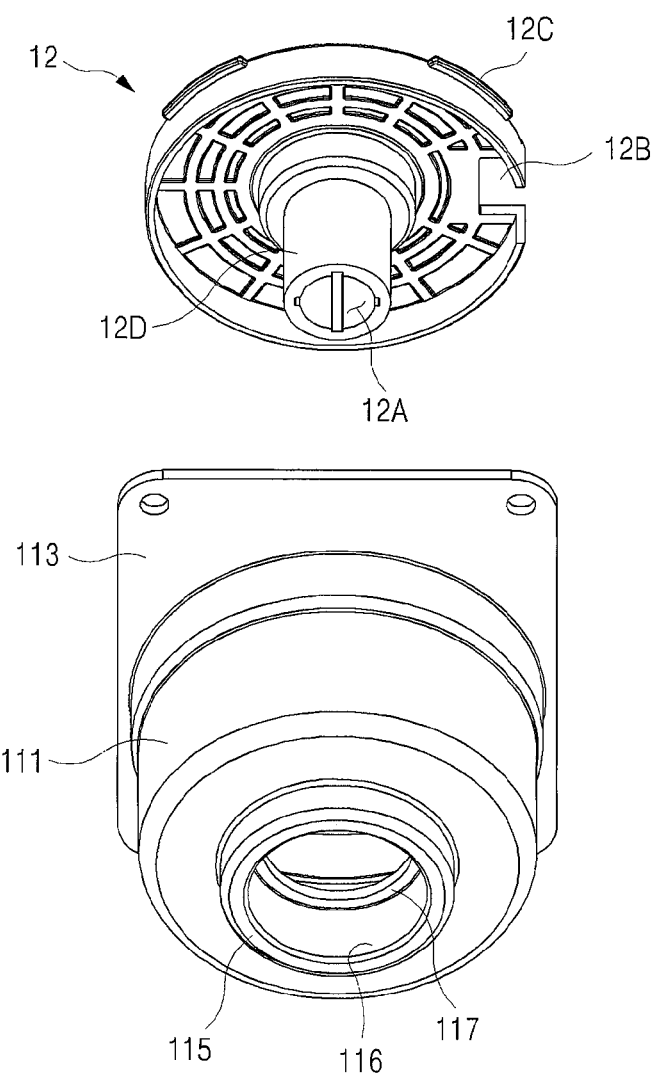

[Fig. 10]
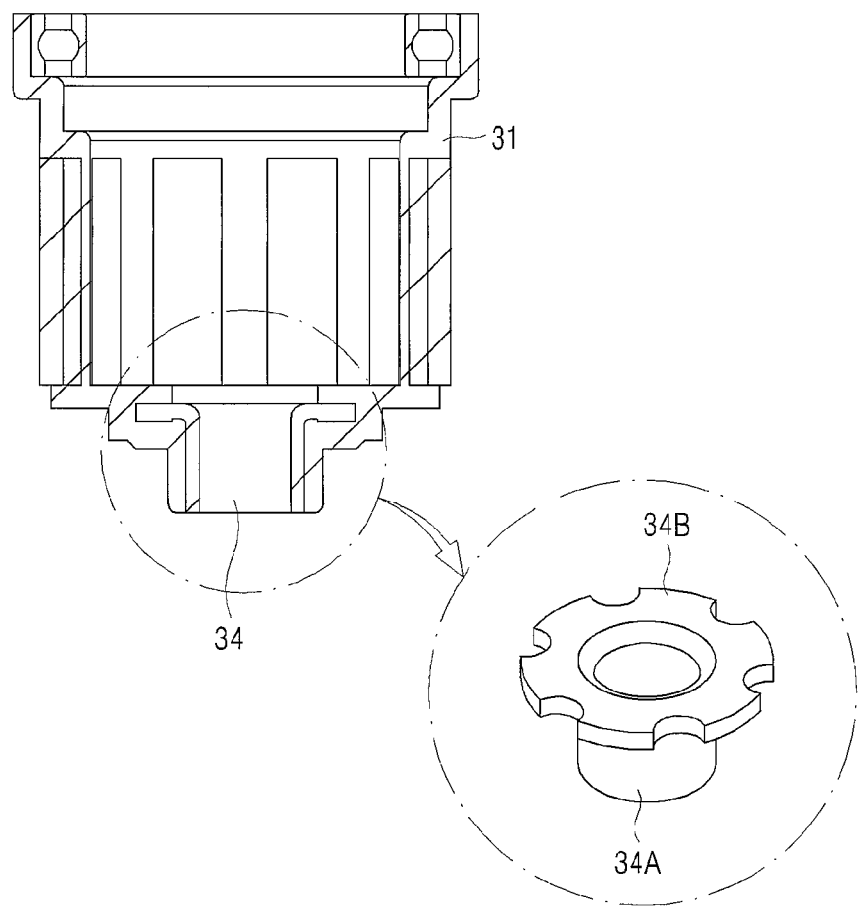

MOTOR WITH NOVEL HOLLOW SHAFT

TECHNICAL FIELD

The present invention relates to a motor. More specifically, the present invention relates to a motor adopting a novel structure of a hollow shaft of a motor used in an integrated brake system, thereby reducing the weight of a motor, reducing manufacturing costs and improving assemblability and productivity.

BACKGROUND ART

In general, a brake system generates pressure in a master cylinder to amplify the force applied to a brake and provides the pressure to a module requiring braking. A hollow shaft motor is used as an apparatus for generating pressure in a master cylinder. Such hollow shaft motor rotates a hollow shaft by the principle of a motor, and applies a screw inside the hollow shaft to use the principle of converting rotary motion into linear motion. The linear motion of the screw actuates a piston to generate or remove the pressure required in the master cylinder.

Recently, an integrated dynamic brake (IDB) system mainly used a motor with a hollow shaft. Since the hollow shaft of the motor needs to generate high pressure by a screw and a piston operating in the hollow shaft, a considerable axial load is imposed on bearings supporting the hollow shaft. In this regard, four-point contact ball bearings may be used to support the rotation of the hollow shaft.

Korean Patent Laid-open No. 10-2016-0001681 discloses a motor having a structure that can manufacture a hollow shaft by a pressing process. Here, however, since the housing has the lower side closed, the assembling operation is difficult, and it is difficult to install a four-point contact ball bearing.

Korean Patent Laid-open No. 10-2017-0006535 discloses a structure of opening the lower side of a housing and assembling a separate cover thereto, and the technique of manufacturing a housing by a pressing process such as deep drawing. According to the structure, a separate cover is assembled to the lower side of the housing to support bearings supporting a hollow shaft, thereby supporting the load imposed on the hollow shaft. Thus, the assemblability and productivity decrease.

In prior art, a hollow shaft is manufactured with a metal sheet material by a continuous pressing process. The hollow shaft manufactured with a metal material by the pressing process has problems of increasing the weight of a motor and raising manufacturing costs.

In order to solve the above-mentioned problems, the present inventors suggest a hollow shaft motor with a novel structure.

DISCLOSURE OF INVENTION

Technical Problem

It is an object of the present invention to provide a hollow shaft motor adopting a novel structure of a plastic resin injection molded product to a hollow shaft, thereby reducing the weight of a motor and reducing manufacturing costs.

The object above and other objects inferred therein can be easily achieved by the present invention explained below.

Solution to Problem

The hollow shaft motor according to the present invention comprises a housing 11 having a cylindrical shape; an upper cover 12 coupled to an upper portion of the housing 11; a lower cover 15 coupled to a lower portion of the housing 11; a stator assembly 20 located in the housing 11; and a rotor assembly 30 located in the stator assembly 20 to rotate, comprising a hollow shaft 31, a rotor core 32 coupled to the hollow shaft 31, and a plurality of magnets 33 arranged on an outer circumferential surface of the rotor core 32 at a certain interval, wherein the hollow shaft 31 is manufactured with a plastic resin by an insert injection molding in the state where the rotor core 32 and the magnet 33 are located in an insert injection mold.

In the present invention, preferably, the hollow shaft 31 comprises a hollow shaft body 311 having a cylindrical shape; and a stepped part 312 protruding from an inside upper portion of the hollow shaft body 311 along an inner circumferential surface, wherein an upper bearing 13 is located and installed in the stepped part 312 in the inside upper portion of the hollow shaft body 311.

In the present invention, preferably, the hollow shaft 31 comprises an outer guide 314 extending downwardly along a lower outer circumferential surface of the hollow shaft body 311 at a certain interval in a longitudinal direction; and an inner guide 315 extending downwardly along a lower inner circumferential surface of the hollow shaft body 311 at a certain interval in a longitudinal direction, wherein the rotor core 32 and the magnet 33 are located between the outer guide 314 and the inner guide 315.

In the present invention, the hollow shaft 31 may further comprise a bottom part 316 having a circular shape, formed in lower ends of the outer guide 314 and the inner guide 315, wherein a screw coupling part 318 extending downwardly from the bottom part 316 is formed.

In the present invention, a guide bush 34 may be located inside the screw coupling part 318.

In the present invention, preferably, the guide bush 34 includes a body 34A having a cylindrical shape and a wing part 34B radially extending from an upper portion of the body.

Advantageous Effects of Invention

The present invention applies a novel structure of a plastic injection molded product to a hollow shaft of a motor, thereby having the effects of reducing the weight of a motor, reducing manufacturing costs, and improving assemblability and productivity.

BRIEF DESCRIPTION OF DRAWINGS

FIG. 1 is a perspective view of a hollow shaft motor according to the present invention;

FIG. 2 is an exploded perspective view of the hollow shaft motor according to the present invention;

FIG. 3 is a cross-sectional view taken along the A-A' direction of FIG. 1;

FIG. 4 is a perspective view of a rotor assembly of the hollow shaft motor according to the present invention;

FIG. 5 is a cross-sectional view of a rotor assembly of the hollow shaft motor according to the present invention;

FIG. 6 is an exploded top perspective view of a rotor assembly of the hollow shaft motor according to the present invention;

FIG. 7 is an exploded bottom perspective view of a rotor assembly of the hollow shaft motor according to the present invention;

FIG. 8 is a top perspective view of an upper cover and a housing of the hollow shaft motor according to the present invention;

FIG. 9 is a bottom perspective view of an upper cover and a housing of the hollow shaft motor according to the present invention; and FIG. 10 is a cross-sectional view of another embodiment of a guide bush of the hollow shaft motor according to the present invention.

Hereinafter, the present invention will be explained in detail with reference to the accompanying drawings.

MODE FOR THE INVENTION

FIG. 1 is a perspective view of a hollow shaft motor 100 according to the present invention. FIG. 2 is an exploded perspective view of the hollow shaft motor 100 according to the present invention. FIG. 3 is a cross-sectional view taken along the A-A' direction of FIG. 1.

Referring to FIG. 1 to FIG. 3 together, the hollow shaft motor 100 according to the present invention includes a housing 11, a stator assembly 20 coupled to an inner side of the housing 11, and a rotor assembly 30 located in the stator assembly 20.

The housing 11 can be manufactured by a continuous process using a pressing equipment such as a transfer mold. The housing 11 has a body part 111 having a cylindrical shape whose upper portion and lower portion are open. The part that is open to the upper side of the housing 11 is an upper opening part 112, and a flange part 113 extending in the horizontal direction is formed around the upper opening part. An upper cover 12 is coupled to the upper opening part 112. The flange part 113 is coupled to a block (not illustrated) of a brake system. A bottom part 114 extending toward the center in the horizontal direction is formed in a lower portion of the body part 111, and a lower protruding part 115 protruding downwardly is formed in a central portion of the bottom part 114. A space in the center of the lower protruding part 115 forms a lower opening part 116. A lower bearing receiving part 117 is formed such that the material of the lower protruding part 115 is bent by a pressing process to extend upwardly from a lower portion.

The lower protruding part 115 has a structure wherein the material is bent and folded, to reinforce strength. Thus, when a great load is imposed on a lower bearing 14, the structure can help supporting the load. The lower bearing 14 is press-fitted and coupled to an inner surface of the lower protruding part 115, and an upper portion of the outer race of the lower bearing 14 is supported by the lower bearing receiving part 117. A lower end portion of the hollow shaft 31 is located in an opening space in the central portion of the lower bearing receiving part 117 and the lower opening part 116. The lower bearing receiving part 117 is preferably bent inwardly at a position higher than the bottom part 114 to extend. This leads to a structure allowing stable support of the lower bearing 14.

The upper cover 12 has a disk shape, and an outer circumferential portion thereof extends downwardly. The outer circumferential surface of the extending portion is press-fitted and coupled to an inner side of the upper opening part 112 of the housing 11. A piston (not illustrated) for moving up and down by the rotation of the hollow shaft 31 is located in a central space 12A formed in the central portion of the upper cover 12. A terminal space 12B is formed at one side of the upper cover 12 to connect a bus bar terminal 25 to an external power source. A plurality of coupling projections 12C protruding in the radial direction is formed in an upper portion of the upper cover 12. Coupling grooves 112A corresponding to the coupling projections 12C are formed around the upper opening part 112 of the housing 11 so that the coupling projections 12C are inserted and coupled to the coupling grooves 112A.

The central space 12A extends downwardly, and a lower sleeve 12D extending downwardly from the central portion of the upper cover 12 is formed to make the central space 12A. An upper bearing 13 is coupled to an upper side of the lower sleeve 12D. An outer race of the upper bearing 13 is supported by an upper portion of the hollow shaft 31 to support the rotation of the hollow shaft 31. The lower sleeve 12D extends downwardly in a central space of the hollow shaft 31. This structure separates the hollow shaft 31 and the central space 12A in the inner side of the sleeve independently to some degree. Thereby, the piston (not illustrated) moving up and down can get an independent movement space.

A lower cover 15 is coupled to the lower protruding part 115 of the housing 11 to cover the lower opening part 116. The lower cover 15 may be press-fitted to an outer side of the lower protruding part 115 or screw-coupled by tapping. A stopper 16 is located in a space of the inner circumferential surface of the lower protruding part 115, and the stopper 16 is interposed between the lower bearing 14 and the lower cover 15 to have a structure of supporting the axial load imposed on the lower bearing 14. The stopper 16 may be a separate member from the lower cover 15 or be formed integrally with the lower cover 15 to be one member, not a separate member.

The stator assembly 20 comprises a stator core 21 press-fitted and fixed to an inner side of the body part 111 of the housing 11, an upper insulator 22 coupled to an upper portion of the stator core 21, and a lower insulator 23 coupled to a lower portion of the stator core 21. A coil (not illustrated) is wound around each insulator, and the coil is electrically connected to a bus bar (not illustrated) of a bus bar housing 24 coupled to an upper portion of the upper insulator 22. The bus bar is electrically connected to a bus bar terminal 25 to supply power from an external power source. The bus bar terminal 25 is surrounded and protected by a terminal cover 26.

The rotor assembly 30 is located in the stator assembly 20 to rotate. To this end, the rotor assembly 30 comprises a hollow shaft 31, a rotor core 32 coupled to the hollow shaft 31, and a plurality of magnets 33 arranged on an outer circumference of the rotor core 32. The detailed structure of the hollow shaft 31 is explained with reference to FIG. 4 to FIG. 7 together.

FIG. 4 is a perspective view of the rotor assembly 30 of the hollow shaft motor 100 according to the present invention, and FIG. 5 is a cross-sectional view thereof.

As illustrated in FIG. 4 and FIG. 5, the rotor assembly 30 of the present invention includes a hollow shaft 31, a rotor core 32 coupled to the hollow shaft 31 along the circumference of the hollow shaft 31, and a plurality of magnets 33. The hollow shaft 31 is formed of a plastic injection molded product, and preferably, the hollow shaft 31 is manufactured with a plastic resin by an insert injection molding after the rotor core 32 and the magnet 33 are located in an insert injection molding. By doing so, the weight of the hollow shaft 31 may be reduced, a step of attaching the magnet 33 to the rotor core 32 with an adhesive, etc. may be omitted, and manufacturing costs may be lowered. The rotor core 32 is manufactured by continuously laminating thin steel sheets, and the plurality of magnets 33 is arranged on the outer circumferential surface of the rotor core 32 at a certain interval. An upper bearing 13 is coupled to an inner side of the upper portion of the hollow shaft 31. The detailed structure of the hollow shaft 31 and the rotor core 32 is explained with reference to FIG. 6 and FIG. 7 together.

FIG. 6 is an exploded top perspective view of the rotor assembly 30 of the hollow shaft motor 100 according to the present invention, and FIG. 7 is an exploded bottom perspective view thereof.

Referring to FIG. 3 to FIG. 7 together, the hollow shaft 31 of the present invention includes a hollow shaft body 311 having a cylindrical shape, a stepped part 312 protruding from an inside upper portion of the hollow shaft body 311 along an inner circumferential surface, a groove part 313 formed along an inner circumferential surface in an inside upper portion of the hollow shaft body 311 at a certain interval in a longitudinal direction, an outer guide 314 extending downwardly along a lower outer circumferential surface of the hollow shaft body 311 at a certain interval in a longitudinal direction, an inner guide 315 extending downwardly along a lower inner circumferential surface of the hollow shaft body 311 at a certain interval in a longitudinal direction, a bottom part 316 having a circular shape, formed in lower ends of the outer guide 314 and the inner guide 315, a reduced diameter part 317 extending downwardly around a hole formed in the center of the bottom part 316 and having a shape with a reduced diameter, and a screw coupling part 318 extending along a lower portion of the reduced diameter part 317, in which an end of a screw (not illustrated) is coupled.

The hollow shaft body 311 has a cylindrical shape with its upper portion open, and a plurality of outer guides 314 and inner guides 315 extend downwardly from the hollow shaft body 311. An upper bearing 13 is accommodated in the stepped part 312 formed in the inside upper portion of the hollow shaft body 311. The groove part 313, which is a weight reducing space, reduces the amount of material of the hollow shaft body 311. The outer guide 314 is positioned between two neighboring magnets 33. The plurality of inner guides 315 is formed to support an inner circumferential surface of the rotor core 32. The bottom part 316 has a disk shape and forms the screw coupling part 318 protruding downwardly from the central portion for a screw to be inserted thereinto. An end of a ball screw (not illustrated) is coupled to the screw coupling part 318, and a guide bush 34 may be located inside the screw coupling part 318 and integrally formed by an insert injection molding in order to reinforce coupling strength. The reduced diameter part 317 having a shape where the diameter is reduced from the upper portion is formed around the upper portion of the screw coupling part 318 in the lower center of the bottom part 316, to allow a structure of reinforcing the strength of the screw coupling part 318.

The rotor core 32 has a cylindrical shape with a central portion empty. A plurality of inner grooves 321 formed at a certain interval in an axial direction is provided in an inner circumferential surface of the rotor core 32, and a plurality of outer grooves 322 formed at a certain interval in an axial direction is provided in an outer circumferential surface thereof. The inner guide 315 is located in the inner groove 321, and is preferably manufactured by an insert injection molding. The outer guide 314 is formed in the outer groove 322, and is preferably manufactured by an insert injection molding. The structure prevents scattering of the magnet 33 by the rotation of the rotor assembly 30, and forms the hollow shaft 31, the rotor core 32 and the magnet 33 integrally as one unit.

FIG. 8 is a top perspective view of a housing 11 and an upper cover 12 of the hollow shaft motor according to the present invention, and FIG. 9 is a bottom perspective view thereof.

Referring to FIG. 8 and FIG. 9 together, the upper cover 12 of the present invention is coupled to an upper opening part 112 of the housing 11. An outer circumferential surface of the upper cover 12 is press-fitted and coupled to an inner circumferential surface of the upper opening part 112, and a plurality of coupling projections 12C formed in the upper cover 12 is inserted and coupled to coupling grooves 112A formed around the upper opening part 112 of the housing 11. A terminal space through which a bus bar terminal 25 passes and to which a terminal cover 26 is coupled is formed at one side of the upper cover 12. A lower sleeve 12D of the upper cover 12 extends downwardly such that a ball screw and a nut (not illustrated) for operating a piston up and down are located in a central space 12A therein. The lower sleeve 12D extends inside an inner guide 315 of the hollow shaft 31 to separate the space where a ball screw, etc. is located, in the hollow shaft 31.

As illustrated in FIG. 10, a guide bush 34 of the present invention may include a body 34A having a cylindrical shape and a wing part 34B radially extending from an upper portion of the body. The wing part 34B is surrounded by a plastic resin, and thus the guide bush 34 may be more firmly coupled to the hollow shaft body 311.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

The invention claimed is:

1. A hollow shaft motor, comprising:
a housing 11 having a cylindrical shape; an upper cover 12 coupled to an upper portion of the housing 11;
a lower cover 15 coupled to a lower portion of the housing 11;
a stator assembly 20 located in the housing 11; and
a rotor assembly 30 located in the stator assembly 20 to rotate, comprising a hollow shaft 31, a rotor core 32 coupled to the hollow shaft 31, and a plurality of magnets 33 arranged on an outer circumferential surface of the rotor core 32 at a certain interval, wherein the hollow shaft 31 is manufactured with a plastic resin by an insert injection molding in the state where the rotor core 32 and the magnet 33 are located in an insert injection mold,
wherein the hollow shaft 31 comprises a hollow shaft body 311 having a cylindrical shape; and a stepped part 312 protruding from an inside upper portion of the hollow shaft body 311 along an inner circumferential surface, wherein an upper bearing 13 is located and installed in the stepped part 312 in the inside upper portion of the hollow shaft body 311, and
wherein the hollow shaft 31 comprises an outer guide 314 extending downwardly along a lower outer circumferential surface of the hollow shaft body 311 at a certain interval in a longitudinal direction; and an inner guide 315 extending downwardly along a lower inner circumferential surface of the hollow shaft body 311 at a certain interval in a longitudinal direction, wherein the rotor core 32 and the magnet 33 are located between the outer guide 314 and the inner guide 315.

2. The hollow shaft motor of claim 1, wherein the hollow shaft 31 further comprises a bottom part 316 having a circular shape, formed in lower ends of the outer guide 314 and the inner guide 315, wherein a screw coupling part 318 extending downwardly from the bottom part 316 is formed.

3. The hollow shaft motor of claim 2, wherein a guide bush 34 is located inside the screw coupling part 318.

4. The hollow shaft motor of claim 3, wherein the guide bush 34 includes a body 34A having a cylindrical shape and a wing part 34B radially extending from an upper portion of the body.

* * * * *